United States Patent [19]

Streicher et al.

[11] 4,341,425
[45] Jul. 27, 1982

[54] MOTOR VEHICLE WHEEL

[75] Inventors: Rudolf Streicher; Manfred Poll, both of Vienna, Austria

[73] Assignee: Vereinigte Metallwerke Ranshofen-Berndorf Aktiengesellschaft, Braunau am Inn, Austria

[21] Appl. No.: 158,125

[22] Filed: Jun. 10, 1980

[30] Foreign Application Priority Data

Jun. 11, 1979 [AT] Austria ................................. 4168/79

[51] Int. Cl.³ ......................... B60B 1/08; B60B 23/00
[52] U.S. Cl. ............................. 301/64 SH; 301/63 R; 301/65; 29/159.03
[58] Field of Search ..................... 301/63 R, 65, 64 R, 301/65 SH; 29/159.1, 159.01, 159.03

[56] References Cited

U.S. PATENT DOCUMENTS

| 3,250,571 | 5/1966 | Richter | 301/65 |
| 3,250,572 | 5/1966 | Walker | 301/65 |
| 3,302,273 | 2/1967 | Benton et al. | 29/159 |
| 4,035,895 | 7/1977 | Lester | 301/65 X |
| 4,185,370 | 1/1980 | Evans | 29/159.1 |

FOREIGN PATENT DOCUMENTS

| 2026709 | 1/1971 | Fed. Rep. of Germany . |
| 2735930 | 7/1978 | Fed. Rep. of Germany ........ 301/65 |
| 1570620 | 6/1969 | France . |

Primary Examiner—Charles A. Marmor
Attorney, Agent, or Firm—Karl F. Ross

[57] ABSTRACT

A light-weight vehicle wheel is formed, according to the invention, by shaping a profiled pressed or stamped sheet or band composed of a malleable aluminum alloy (AlMgSl or AlZn4.5Mgl) into the rim or felly, the wheel disk being cast from a casting alloy such as GK(GD)—AlSi12 or GK-AlSi7Mg.

2 Claims, 4 Drawing Figures

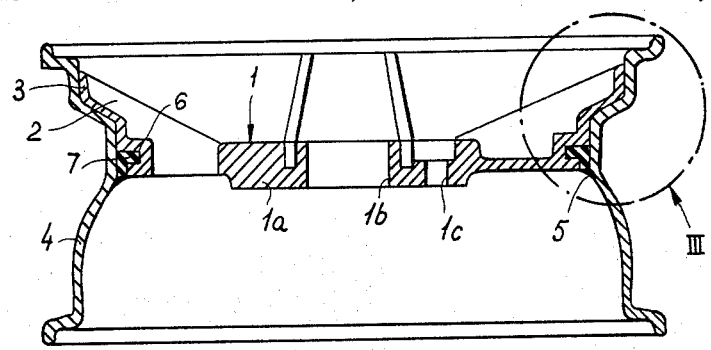
FIG.1
FIG.2A
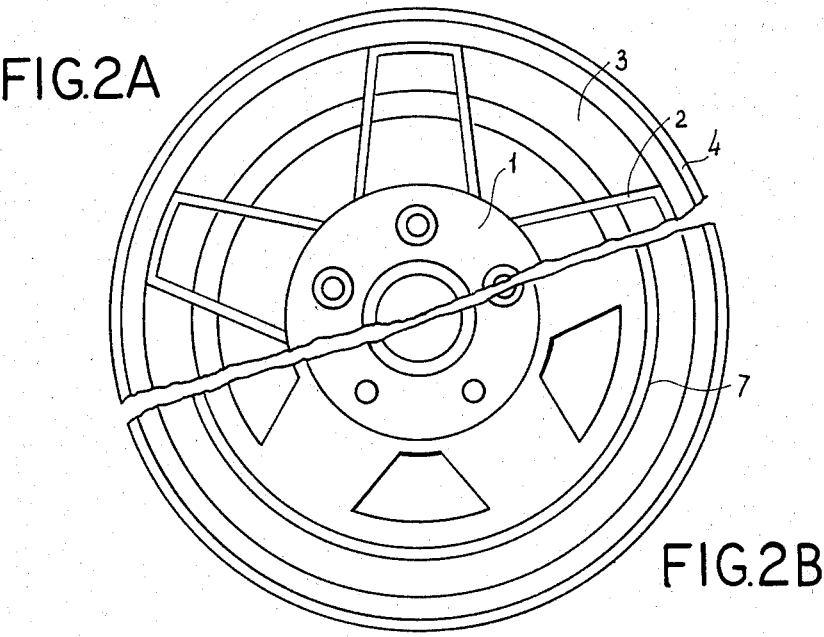
FIG.2B
FIG.3
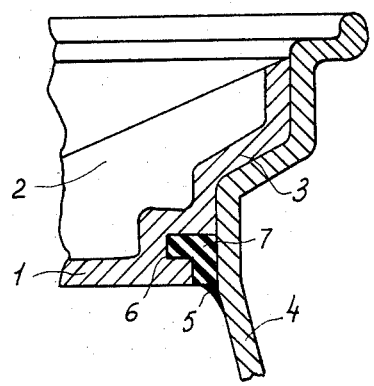

MOTOR VEHICLE WHEEL

FIELD OF THE INVENTION

The present invention relates to a motor vehicle wheel and, more particularly, to a light-weight or aluminum wheel for motor vehicles.

BACKGROUND OF THE INVENTION

In recent years considerable effort has been made in attempting to reduce the weight of motor vehicles, generally as a fuel-saving measure. It has already been proposed to reduce vehicle weight by substituting light metal alloys and especially aluminum alloys for much of the steel which has hitherto been used in vehicle bodies and chassis.

Naturally, attempts have also been made to substitute light metal wheels for the iron or steel wheels which have generally been employed.

Emphasis has thus far been placed on the use of aluminum wheels which can be fabricated in a variety of ways, generally by casting, forging or some other techniques.

For example, it is known to fabricate aluminum wheels by a low-pressure die-casting process using casting alloys such as AlSi12, AlSi12Mg and AlSi7Mg.

Forged alloys for the production of wheels generally make use of AlMg1wa.

In a third technique as used heretofore, an aluminum wheel is fabricated from aluminum sheet or strip in the same manner as conventional steel wheels. Thus the felly or rim is formed by buttwelding the ends of a band, bent into a cylindrical configuration, and rolling the resulting ring to the desired profile. The wheel disk is stamped from the band and deepdrawn to the desired configuration and the two parts are joined together by welding.

The weight saving is greatest with the latter approach although the strength and stability characteristics of the resulting wheel are not always satisfactory.

OBJECT OF THE INVENTION

It is the principal object of the present invention to provide an aluminum wheel for motor vehicles which will eliminate disadvantages of earlier wheel structures and, at the same time, provide a light-weight wheel of especially high strength, resistance to deformation and stability.

SUMMARY OF THE INVENTION

This object and others which will become apparent hereinafter are attained, in accordance with the invention, with an aluminum wheel which is fabricated with a felly or rim composed of a malleable aluminum alloy, preferably AlMgSi1 or AlZn4.5Mg1, while the wheel disk is fabricated from a cast alloy preferably GK(GD)-AlSi12 or GK-AlSi7Mg.

In the wheel of the present invention, therefore, one can obtain a high weight saving since the felly is formed from sheet material and at the same time improved configurations of the wheel disk can be utilized to ensure the desired stability, versatility and strength of the wheel.

For example, the wheel disk can have the configurations of a perforated disk formed with holes for the lug bolts and windows where required or desired, or the configuration of a spoked disk.

While, in one embodiment of the invention, the rim or felly is produced from the strip alloy in the manner described, it has also been found to be possible to utilize instead of a sheet, a pressed profile having the cross section desired for the felly and to bend this profile into a cylindrical shape.

The material from which the felly is composed should correspond to the high strength alloy AlZn4.5Mg1 having the properties in Austrian Industrial Standard (ONORM) M 3430 or German Industrial Standard DIN 1725 Part I.

In its most preferred embodiment, the invention utilizes the casting alloy AlSi12 for the wheel disk in a die-casting or low-pressure mold-casting process.

Since malleable and cast alloys of light metals cannot readily be welded together, the present invention provides that elements having a chemical composition compatible with that of the felly material can be incorporated in the wheel disk by casting, thereby facilitating the welding. The materials of the latter type can be S-AlMg4.5Mn or S-AlMg5 according to Austrian Industrial Standard ONORM M 7825 or German Industrial Standard DIN 1732 Part I.

By comparison with other age hardenable aluminum alloys, AlZn4.5Mg1 has a relatively wide temperature range for solution tempering, a low quenching sensitivity and a relatively large inertia with respect to aging, especially at room temperature.

The heat supplied during welding, therefore, provides only an additional solution tempering and the cooling of the wheel after welding, because of high thermal conductivity, functions as a mild quenching.

As a result, the strength values in the welding zones immediately after welding, although relatively low, rise significantly with subsequent aging at room temperature or elevated temperature (120° to 130° C.) to relatively high values. Thus after room temperature storage for three months the strength characteristics in these zones rise to the original levels characteristic of the starting materials and aging for 24 hours at a 120° C. has a similar effect.

BRIEF DESCRIPTION OF THE DRAWING

The above and other objects, features and advantages of the present invention will become more readily apparent from the following description, reference being made to the accompanying drawing in which:

FIG. 1 is an axial cross sectional view through the wheel of the present invention.

FIG. 2A is a side view of the front side of the wheel;

FIG. 2B is a side view of the rear thereof; and

FIG. 3 is a detail view of the region III of FIG. 1, drawn to a larger scale.

SPECIFIC DESCRIPTION

According to the invention, a cast wheel disk 1 is formed with a hub 1a provided with a central opening 1b and angularly equispaced passages 1c for the lug bolts of the vehicle. The hub 1a is cast unitarily with spokes 2 and a peripheral ring 3 which abuts the inner surface of a deep-bed felly or rim 4, the latter being formed from pressed sheet material which is bent into the cylindrical configuration shown with the ends of the bent member buttwelded together.

The wheel disk 1 and the felly 4 are joined together by welds at 5 securing the felly to an insert 7 in the form of an angle-profile ring cast into the disk. The ring 7, which is composed of the same material as that of the deep-bed rim, or another material weld-compatible therewith, is visible at the back of the wheel but is firmly anchored therein so that axial separation is impossible. The ring adjoins an inner cylindrical portion of the felly which is adjacent a frustoconical portion. The outer rim or peripheral ring 3 of the cast disk conforms to these portions and lies therealong. Instead of an angle groove 6, the groove can have an undercut T or dovetail configuration.

Naturally, instead of a single ring 7, individual spaced-apart members can be cast in place or swaged or otherwise attached to the wheel disk.

For rail vehicles the felly or rim can be replaced by a steel rim.

We claim:

1. An aluminum wheel for a vehicle comprising a felly composed of a malleable aluminum alloy selected from the group which consists of AlMgSi1 and AlZn4.5Mg1 and provided with an inner cylindrical portion adjoining a frustoconical portion, a wheel disk composed of a cast alloy selected from the group which consists of GK(GD)-AlSi12 and GK-AlSi7Mg, said disk having a hub, an outer rim and spokes cast unitarily with and interconnecting said hub and said rim, said rim conforming to the shape of and fitting against said portions of said felly, said rim being formed with an outwardly open angle-section groove opening toward said inner cylindrical portion, and means including a ring cast into said wheel disk and fitting within said groove, said ring being composed of a material which is weld compatible with said felly and selected from the group consisting of S-AlMg4.5Mn, S-AlMg5 or the same material as said felly and at least one weld joining said ring to said felly for securing said felly to said wheel disk.

2. The wheel defined in claim 1 wherein said felly is composed of heat-ageable malleable aluminum alloy.

* * * * *